No. 714,740. Patented Dec. 2, 1902.
C. A. PORTER.
EVAPORATING PAN.
(Application filed June 9, 1902.)
(No Model.) 3 Sheets—Sheet 1.
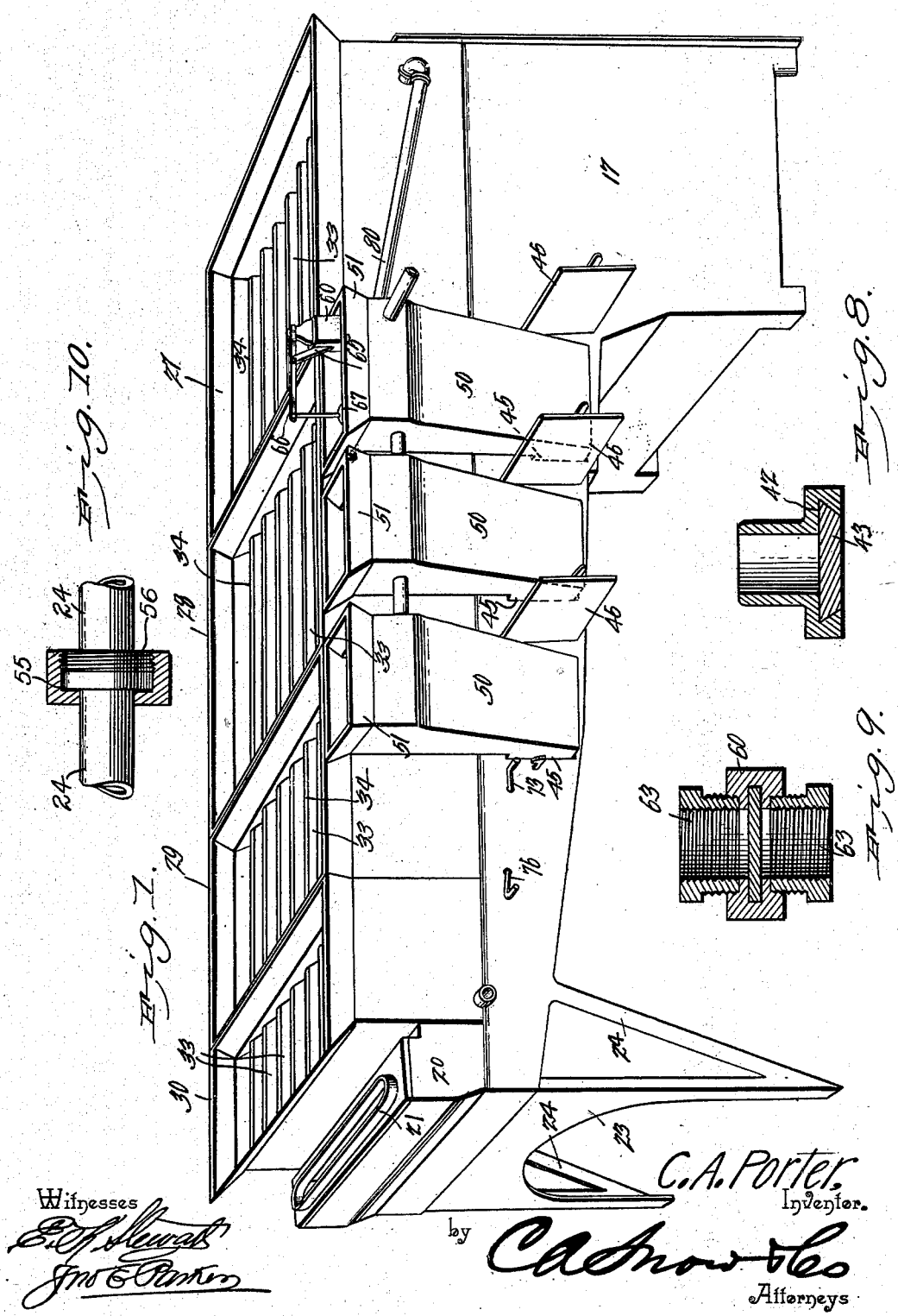

No. 714,740. Patented Dec. 2, 1902.
C. A. PORTER.
EVAPORATING PAN.
(Application filed June 9, 1902.)
(No Model.) 3 Sheets—Sheet 2.
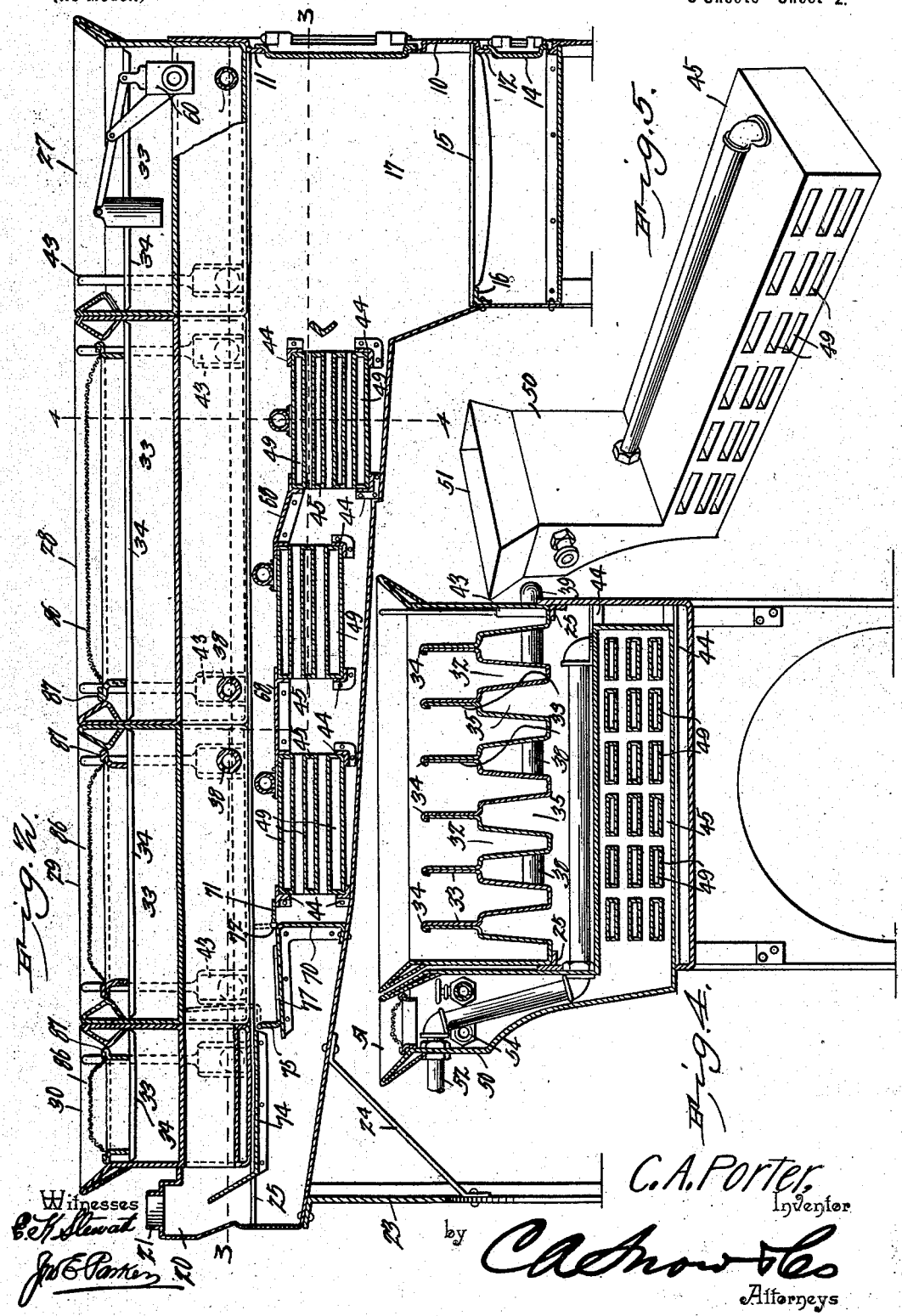

No. 714,740. Patented Dec. 2, 1902.
C. A. PORTER.
EVAPORATING PAN.
(Application filed June 9, 1902.)
(No Model.) 3 Sheets—Sheet 3.
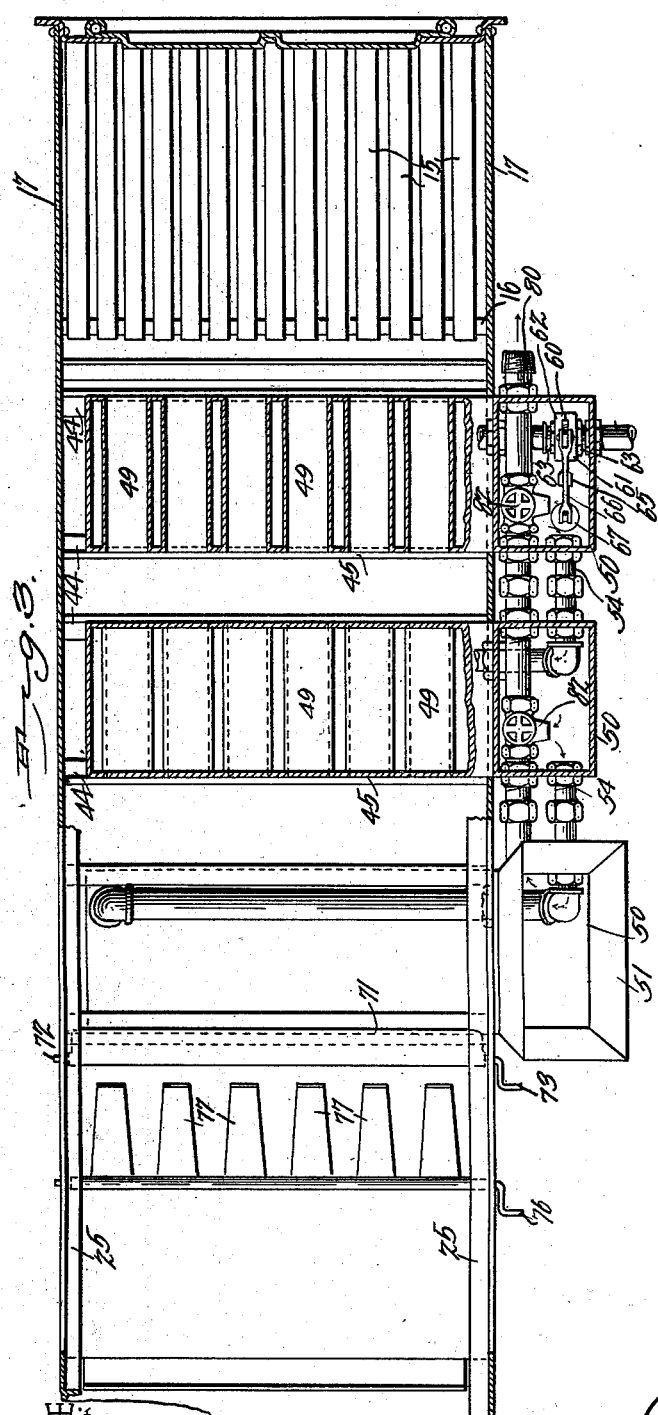
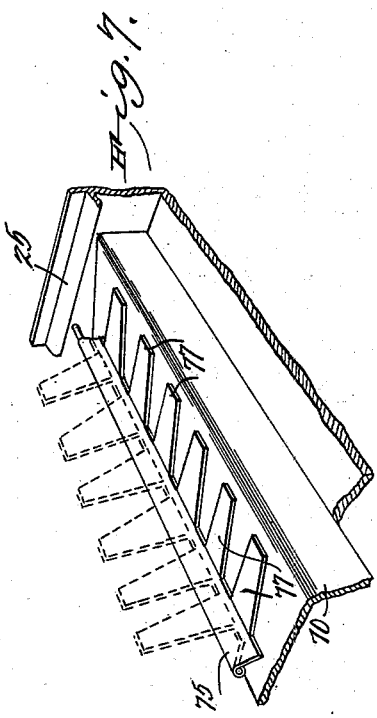
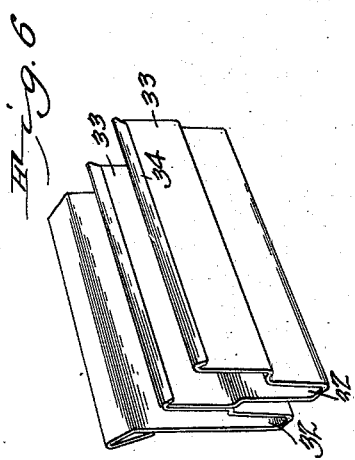
Witnesses C. A. Porter, Inventor.
by Attorneys

UNITED STATES PATENT OFFICE.

CALVIN A. PORTER, OF WEST WILLIAMSFIELD, OHIO.

EVAPORATING-PAN.

SPECIFICATION forming part of Letters Patent No. 714,740, dated December 2, 1902.

Application filed June 9, 1902. Serial No. 110,904. (No model.)

*To all whom it may concern:*

Be it known that I, CALVIN A. PORTER, a citizen of the United States, residing at West Williamsfield, in the county of Ashtabula and State of Ohio, have invented a new and useful Evaporator, of which the following is a specification.

My invention relates to certain improvements in evaporators, and especially to evaporating apparatus of that class employed in the boiling of maple-sugar and other syrups, and has for its principal object to provide an improved form of evaporator in which the heat from the fire may be utilized to better advantage than in the similar devices in ordinary use.

A further object of the invention is to arrange the evaporator in the form of a series of separately-removable pans so constructed as to form continuous flues from end to end for the passage of the products of combustion.

A still further object of the invention is to so construct the separate pans as to form alternate passages for the juice and flues for the passage of the products of combustion and to reinforce the upper edges of the pans, so that there will be little danger of their becoming warped by the action of the heat or bent or otherwise injured when removed from position.

A still further object of the invention is to provide, in connection with the pans, a number of auxiliary heaters in which the temperature of the juice may be raised before passing into the first evaporating-pan and to further provide for the discharge of the juice from any one or all of such heaters to the first pan.

A still further object of the invention is to so construct the heaters that they may be connected in series and a constant circulation maintained to effect the gradual heating of the juice prior to its discharge to the first evaporating-pan.

A still surther object of the invention is to so arrange the various evaporating-pans as to afford a continuous channel for the movement of the juice from the first pan to the finishing-pan.

A still further object of the invention is to so arrange and construct the arch and the several pans as to provide for the supply of a greater quantity of heat at the finishing-pan than can be accomplished in similar devices in ordinary use, to provide for the control of the heat by movable dampers, and to permit the shutting off of the heat from the finishing-pan without lowering the fire when it is desired to draw off the juice or where the heat is in excess of that required for the purpose.

A still further object of the invention is to provide a simple and economical construction of evaporator-arch of which the parts may be readily assembled.

With these and other objects in view the invention consists in the novel construction and arrangement of parts hereinafter described, illustrated in the accompanying drawings, and particularly pointed out in the appended claims.

In the drawings, Figure 1 is a perspective view of an evaporator constructed in accordance with my invention. Fig. 2 is a longitudinal sectional elevation of the same. Fig. 3 is a sectional plan view of the evaporator on the line 3 3 of Fig. 2. Fig. 4 is a transverse sectional elevation of the same on the line 4 4 of Fig. 2. Fig. 5 is a detached perspective view of one of the auxiliary heaters removed from the arch. Fig. 6 is a detail perspective view illustrating the construction of a portion of one of the evaporating-pans. Fig. 7 is a detail perspective view of one of the dampers for governing the course of the products of combustion. Figs. 8 and 9 are detailed views of valves which may be employed for governing the flow of juice. Fig. 10 is a sectional elevation illustrating, on an enlarged scale, a form of pipe-coupling which may be employed to connect the pans and the heaters.

Similar numerals of reference are employed to indicate corresponding parts throughout the several figures of the drawings.

The main body of the arch is preferably formed of sheet-iron, while the front is in the form of a cast-iron plate 10, having upper and lower inset portions 11 and 12, respectively, there being fire-doors in the upper portion which are normally closed, while in the lower portion are the ash-pit doors 14, which may be opened to a greater or less extent to supply the air necessary for the support of combustion. The grate-bars 15 are supported at the front end on the inwardly-projecting flange formed by the upper portion of the inset portion 12, and at their rear ends rest upon an angle-iron 16. The side flanges formed by both inset portions are drilled for the passage of rivets or bolts for securing the side plates 17 of the arch in place, as indicated in Fig. 3. The bottom of the ash-pit is formed of a metallic plate having its front edge secured to the bottom shoulder or flange of the lower inset portion 12.

From the fire-box to the rear end of the arch the bottom plate is gradually brought closer to the horizontal line of the upper edge of the arch to form a gradually-contracted flue or passage for the products of combustion, and at the rear end is a smoke-box 20, which may be formed of cast-iron and provided with a vertically-disposed collar or flange 21 for the reception of the lower portion of the stack or escape-flue. The rear end of the arch is supported by an end standard 23, having a leg at each side of the arch and braced and held in place by an inclined auxiliary bar 24, connected to the sides of the arch.

To the inner face of each side of the arch is bolted an angle-iron 25, the upper face of the angle-iron being somewhat below the upper edge of the arch and arranged in the same plane with the upper shoulder or flange of the inset portion 11 of the front plate. The angle-irons serve to support a plurality of evaporating-pans 27, 28, 29, and 30, of which the pan 27 is partly supported by the shoulder on the front plate 10. The front pan 27 is the preliminary evaporating-pan of the series, and the juice enters this pan either from a tank or other source of supply or after a preliminary heating by the auxiliary heating devices hereinafter described. The juice passes in a tortuous course through the successive pans until the finishing-pan 30 is reached, where it is retained until the desired amount of water has been eliminated by evaporation, and from thence it is drawn off for use.

Each of the evaporating-pans is formed of tin, galvanized iron, or other sheet metal, and each comprises a plurality of sheets of metal bent in the manner indicated more clearly in Fig. 6. The central portion of the sheet is so bent as to form a contracted channel or passage 32, and is thence bent outwardly and upwardly to form vertical walls 33, such walls being placed closely against and secured to the adjacent walls of other sections to form a thickened and reinforced partition, while leakage is to some extent prevented by forming a downwardly-turned flange at the edge of one sheet for the reception of the upper edge of the adjacent edge of the opposite sheet. The end sections of the pan are then secured in place to form a pan having a series of parallel channels 32, extending from end to end of the pan. The arrangement of these channels is such that on the under side of the pan they form a plurality of flues 35 for the passage of the products of combustion, the bottom of the pan having as a whole a corrugated appearance, as indicated more clearly in Fig. 4.

The material which forms the sides and ends of each pan is bent to form a box edge by first flaring the metal outwardly to increase the width of the pan and thence bending the same downwardly and inwardly until the edge of the sheet touches the side of the pan, after which it is secured in place by soldering. In this manner the metal is bent into substantially triangular form and forms a rigid bracing support, materially strengthening the edge of the pan and tending to hold the same in shape when subjected to the action of heat and to prevent bending or mutilation of the pan when the latter is removed from position. The edges of all the pans are made in this manner except those edges where two pans are in contact with each other, and in this case the metal is first bent inwardly and then rebent until the edge is in contact with the inner surface of the pan, as shown at the meeting edges of the pans in Fig. 2. The formation of the pans in this manner tends to some extent to prevent the juice from boiling over by affording an increased area for its expansion and allowing the steam free escape by the separation of the bubbles and the parting of the scum which rises to the surface of the juice. By arranging the edges of the meeting portions of the pan with the inward turns the pans may be placed closely together and the flues on the under side of said pans rendered practically continuous from end to end of the arch.

The several channels of the pans are arranged in series by alternately-disposed connecting-tubes 38, extending across the flues and connecting adjacent channels, and so forming a tortuous course in each of the pans for the flow of the juice, the latter being rapidly moved and circulated under the action of the heat and the formation of caramel prevented.

In order to connect adjacent pans and so provide a continuous course for the flow of the juice, there is arranged at the discharge end of one pan and the adjacent inlet end of the next succeeding pan a pair of nipples 39, having pipe-sections 40, connected together by detachable couplings 41, which may be readily separated when it is desired to disconnect and remove any one of the pans for cleansing or other purposes. On the inner side of the pan on each side of the outlet-opening leading to the nipple are undercut guides 42 for the reception of a gate-valve 43, having a handle extending up to or above the top of the pan, this valve being moved to closed position before the coupling is loosened.

Extending transversely of the arch are a number of angle-bars 44, arranged in sets and forming guides for the reception of the preliminary heating devices 45 of the character more clearly shown in Fig. 5. Four angle-bars are used for the support of each of the heaters, and in one of the side walls of the arch are suitable openings, through which said pans may be inserted or withdrawn from position in the arch. When the heaters are not in use, these openings may be closed by suitable doors 46 in order not to interfere with the draft.

The heaters 45 have a rectangular body portion adapted to fit within the space bounded by the four angle-bars of each set, and extending transversely therethrough are a number of flues 49 for the passage of the products of combustion. At one end of the body portion are vertically-disposed chambers 50, extending up for a distance level with or above the tops of the evaporating-pans, and at the top of the chambers are box edges 51 of a character similar to those surrounding the edges of the evaporating-pans. The juice is supplied to the first pan or heater through a pipe 52, which extends down through the chamber 50 and thence parallel with and above the body portion of the heater, communicating with the opposite end thereof in order to deliver the juice near the extreme end of said heater. As the temperature is increased the juice flows to the highest point in the chamber 50 and passes through a pipe or tube 54, leading to a pipe 52 in the second pan, and in similar manner the juice passes through any desired number of heaters until the required temperature is attained. In the present instance three heaters are employed, each of the same construction and the circulation through each being the same. The couplings on the pipes 24 between the sections are so arranged as to be readily separated when it becomes necessary to remove one of the heaters. The coupling employed may be of the character illustrated in Fig. 10, wherein one pipe-section is provided with an end flange and carries a nut 55, while the opposite pipe-section has a threaded flange 56 for the reception of said nut. This form of coupling may be employed between the various heaters and evaporating-pans or any ordinary or preferred form of coupling may be substituted therefor.

In the initial pan or the initial heater, as the case may be, the inlet-pipe is provided with a gate-valve 60, adapted to a suitable valve-casing, which is preferably formed in two sections 61 62, having a space for the reception of the valve and each section having a nipple 63, to which the adjacent ends of the pipes may be connected. To the valve-casing is secured an arm 65, to which is pivoted a lever 66, connected at one end to the valve and at the opposite end being provided with a float 67, which is partially submerged in the juice, and when the latter rises above a normal level the valve will be automatically closed.

The adjacent upper bars 44, which guide and support the several heaters, are connected to or formed integral with plates 68, which serve to prevent the escape of the products of combustion into the main flues before passing through the flues of all of the pans, and these plates serve, in connection with the tops of the heaters, to form a contracted passage below the flues and the bottoms of the evaporating-pans, and thus deflect the products of combustion into said flues and against the bottoms of the pans.

At a point beyond or to the rear of the last of the heaters is a deflecting-plate 70, bent at right angles to form a horizontal and a vertical portion, the vertical portion extending from the bottom of the arch to a point level with the top of the final heater of the series, the space between the plate and heater being closed at the top by a damper 71, pivoted at 72 and provided with an operating-handle 73, extending through one of the side walls of the arch. When this damper is in the position illustrated in full lines in Fig. 2, it will prevent the passage of the products of combustion through the flues of the heaters; but when opened to the dotted-line position a portion of the products of combustion will pass through the heater-flues, and thence up to the main flues at a point under the evaporating-pan 29, there to mingle with the products of combustion passing through the main flues and supply an increased volume of heated gases for contact with the rear portion of the pan 29 and the finishing-pan 30. As it is desirable to fully utilize all of the heat at the finishing-pan, the arch is provided with a horizontal plate 74 immediately under the finishing-pan to compel the increased volume of gas to pass through the flues of the finishing-pan, and thence into the smoke-box 20 on its way to the stack.

In some cases it may become necessary to reduce the heat at the finishing-pan without lowering the fire, as when the juice is being drawn off in finished condition, and for this purpose a passage is formed between the front edge of the plate 74 and the rear portion of the plate 70. This passage is normally closed by a damper 75, having an operating-handle 76 at one side of the arch, and said damper is of the peculiar construction more clearly illustrated in Fig. 7, having a strip 76, adapted to close the passage between the two plates when in the position shown in full lines in Fig. 2, and a plurality of spaced fingers 77 of a shape corresponding to the contour in cross-section to the flues of the evaporating-pan. The strip 76 and fingers 77 are arranged in planes substantially at a right angle to each other, and when the damper is closed these fingers rest on the horizontal portion of the plate 70. When the damper is moved to the opposite position, as indicated by dotted lines in Figs. 2 and 7, the fingers 77 enter the flue-spaces and completely stop the flues, all of the products of combustion being deflected through the escape-passage, and thence under the plate 75 to the smoke box and stack. In this manner the products of combustion may be cut off in whole or part from contact with the finishing-pan.

The flues of the finishing-pans may be of the same character as those of the remaining pans or may be of the character illustrated in Fig. 2, wherein said flues take the form of tubes, extending from end to end of the pan and situated a slight distance above the bottom of said pan.

After the juice is fully heated in the several pans it becomes necessary to provide for its passage to the first evaporating-pan 27, and for this purpose I employ a pipe 80, extending from the final heater to the first of the evaporating-pans, and in said evaporating-pan place a valve controlled by the depth of the juice to automatically control the flow into said pan. The pipe 80, between the several heaters and the first evaporating-pan, is provided with pipe-couplings of the character illustrated in Fig. 10 to permit of the ready disconnection of any one of the heaters.

The pipe 80 has direct communication with the final heater of the series, and in the first and second heaters the pipe is provided with three-way cocks 82, by which the flow of juice may be governed. These cocks may be so turned as to cause the flow of juice direct from the final heater to the first evaporating-pan or from either of the pans singly, or the pipe may be connected to all of the heaters.

A further feature of the invention consists in providing each of the heaters and pans with a cover 86, formed of wire-gauze or similar material, which when the juice is boiling will come into contact with the juice should there be any tendency to boil over the edges of the pan. The contact of the wire with the juice causes the breaking up of the air bubbles and the release of steam and air and prevents the juice from boiling over the edges of the pans. The wire screens 86 are secured to rectangular frames 87, which may be readily removed from position when necessary.

While all of the juice-containing receptacles act in a measure as evaporating-pans, the small surface of the vessels 50 exposed to the air will to some extent limit the evaporation, and in the description these vessels have been termed "heaters" to distinguish them from the shallow evaporating-pans located at the top of the arch and having an extensive area exposed to the atmosphere.

While the construction herein described, and illustrated in the accompanying drawings is the preferred form of the device, it is obvious that various changes in the form, proportions, size, and minor details of the structure may be made without departing from the spirit or sacrificing any of the advantages of the invention.

Having thus described the invention, what I claim is—

1. The combination in an evaporator, of an arch, and a series of independently-removable pans carried by the arch, each of said pans being provided with corrugations extending longitudinally of the arch and forming liquid-containing channels on the inner surface of the pan and conducting-flues in the bottom of the pan, said pans being arranged in a common horizontal plane and the adjacent end walls of the several pans being vertically disposed and abutting to form continuous flues from end to end of the arch.

2. The combination in an evaporator, of an arch, a series of independently-removable pans carried by the arch, each of said pans being provided with corrugations extending longitudinally of the arch and the several pans having abutting end walls to form continuous bottom flues from end to end of the arch, said corrugations forming liquid-containing channels within the pan, connecting-tubes extending across the flues and alternately connecting the opposite ends of the channels of the pans, and means for connecting the pans in series to form a continuous tortuous passage for the juice from the front to the rear end of the arch.

3. The combination in an evaporator, of the arch, a plurality of evaporating-pans carried thereby and each provided with longitudinally-disposed corrugations forming heat-conducting flues, the metal at the edges of the pans being bent into triangular form to brace and stiffen the pans, the similar edges of connecting-pans being inwardly turned in order to permit the ends of the pans to come into close contact and preserve the continuity of the heat-conducting flues from end to end of the arch.

4. An evaporating-pan having a corrugated bottom formed of a plurality of sections each bent in such manner as to form a liquid-containing channel and a portion of a partition-wall, said sections when assembled forming a double partition-wall and a series of alternately-disposed flues and channels, and side and end walls connected to said corrugated bottom to form a pan.

5. A pan-bottom formed of a plurality of connected sections each bent in such manner as to form a channel and a portion of a heat-conducting flue, the opposite edge portions of each section being thence bent upwardly and extending above the tops of the flues to form one-half of a partition-wall and the edges of adjacent sections being united by overlapping joints, substantially as described.

6. The combination in an evaporator, of the arch having openings in its side walls, a plurality of heaters disposed within the arch and having heat-conducting flues, a plurality of evaporating-pans carried by said arch, and means for connecting the series of heaters and pans to form a continuous passage for the juice from the initial heater to the final or finishing pan.

7. The combination in an evaporator, of an arch having a plurality of openings in one wall, a series of heaters disposed within the arch and removable through said openings, each of said heaters having flues for the passage of the products of combustion, heater-supports within the arch, doors for closing the openings on the removal of the heaters, and evaporating-pans carried by the arch.

8. The combination in an evaporator, of the arch having a plurality of openings in one side wall, heaters arranged within the arch and removable through said openings, each of the heaters having flues for the passage of the products of combustion, evaporating-pans carried by the arch, means for connecting the several heaters in series, and means for controlling the flow of juice from any one or all of said heaters to the preliminary evaporating-pan.

9. The combination in an evaporator, of the arch, the pans supported thereby, a heater disposed within the arch at a point below the pans and having an outwardly and upwardly extending chamber at one side of the arch, a connecting-pipe extending between said chambers and the preliminary evaporating-pans, and a feed-pipe extending down through said chamber and connected to the heater.

10. The combination in an evaporator, of the arch, an evaporating-pan carried thereby, and a removable heater arranged within the arch below the pan, said heater comprising a lower portion having heat-conducting flues, and an upper portion forming a chamber disposed at the side of the arch and connected to the evaporating-pan.

11. The combination in an evaporator, of the arch, a plurality of evaporating-pans carried thereby, a series of heaters supported within the arch at a point below the pans, connecting-plates extending between the upper heater-supports to form a separate heater-flue, and a damper controlling the passage of the products of combustion through said flue.

12. The combination in an evaporator, of the arch, a plurality of evaporating-pans carried thereby, a plurality of heaters disposed within the arch at points below the pans, auxiliary plates extending between the upper portions of the heaters and serving to form a separate flue independent of the pan-heating flue, and a damper for controlling the passage of the products of combustion.

13. The combination in an evaporator, of the arch, a series of evaporating-pans carried thereby, a plurality of heaters disposed within the arch and having a separate heat-flue formed partly by the heaters and partly by auxiliary plates extending between the upper edges of adjacent heaters, and a damper arranged at the rear end of said flue for controlling the course of the products of combustion.

14. The combination in an evaporator, of the arch, a series of evaporating-pans carried thereby, angle-bars extending transversely of the arch, heaters supported and guided by said angle-bars, auxiliary flue-plates connecting the upper angle-bars between adjacent heaters, an end plate disposed to the rear of the final heater and forming an end chamber communicating with the main flue, and a damper for controlling the course of the products of combustion through said chamber.

15. The combination in an evaporator, of the arch, evaporating-pans carried thereby and having flues extending longitudinally of the arch, a division-plate arranged below the final pan of the series and forming an auxiliary escape-flue in communication with the stack, and a damper for governing the course of the products of combustion, said damper being provided with a plurality of fingers adapted to enter and close the pan-flues, substantially as specified.

In testimony that I claim the foregoing as my own I have hereto affixed my signature in the presence of two witnesses.

CALVIN A. PORTER.

Witnesses:
F. J. BISHOP,
L. M. PORTER.